(12) United States Patent
Mohamed et al.

(10) Patent No.: US 10,057,846 B2
(45) Date of Patent: Aug. 21, 2018

(54) ASSOCIATING STATION WITH MASTER STATION

(71) Applicant: Intel IP Corporation, Santa Clara, CA (US)

(72) Inventors: Ahmed Gamal Helmy Mohamed, Richardson, TX (US); Shahrnaz Azizi, Cupertino, CA (US); Mohamed K. Hassanin, SunnyVale, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 228 days.

(21) Appl. No.: 14/973,224

(22) Filed: Dec. 17, 2015

(65) Prior Publication Data

US 2017/0181073 A1 Jun. 22, 2017

(51) Int. Cl.
*H04W 48/20* (2009.01)
*H04W 60/00* (2009.01)
(Continued)

(52) U.S. Cl.
CPC ......... *H04W 48/20* (2013.01); *H04W 40/244* (2013.01); *H04W 60/005* (2013.01); *H04W 72/02* (2013.01)

(58) Field of Classification Search
CPC ............. H04W 84/12; H04W 72/0453; H04W 74/0816; H04W 72/042; H04W 72/0413; H04W 88/08; H04W 72/04; H04W 72/02; H04W 74/04; H04W 24/02; H04W 56/002; H04W 72/044; H04W 74/006;
(Continued)

(56) References Cited

U.S. PATENT DOCUMENTS

| | | | | |
|---|---|---|---|---|
| 2016/0353357 | A1* | 12/2016 | Asterjadhi | H04L 5/0007 |
| 2017/0006608 | A1* | 1/2017 | Josiam | H04W 72/0453 |
| 2017/0047972 | A1* | 2/2017 | Chu | H04B 7/0452 |
| 2017/0064718 | A1* | 3/2017 | Bharadwaj | H04W 72/0493 |
| 2017/0170939 | A1* | 6/2017 | Huang | H04L 5/0007 |
| 2017/0171810 | A1* | 6/2017 | Cariou | H04W 52/0206 |
| 2017/0230155 | A1* | 8/2017 | Lee | H04L 5/0044 |

(Continued)

OTHER PUBLICATIONS

"IEEE Std", IEEE Std 802.11n-2009, (Oct. 29, 2009), 261-267, 293-296, 301-302.
(Continued)

*Primary Examiner* — Wutchung Chu
*Assistant Examiner* — Najeebuddin Ansari
(74) *Attorney, Agent, or Firm* — Schwegman Lundberg & Woessner, P.A.

(57) ABSTRACT

Generally discussed herein are devices and methods for station and master station association. A device can include a memory to store instructions and channel condition data, and processing circuitry coupled to execute the instructions and configure the processing circuitry to decode first information provided in a first transmission from a first access point (AP), the first information indicating channel conditions of an entire bandwidth of the first AP including a primary channel and one or more secondary channels of the first AP, decode second information provided a second transmission from a second AP, the second information indicating channel conditions of an entire bandwidth of the second AP including a primary channel and one or more secondary channels of the second AP, and determine which of the first and second APs to associate with based on the first and second decoded information.

17 Claims, 6 Drawing Sheets

(51) Int. Cl.
*H04W 40/24* (2009.01)
*H04W 72/02* (2009.01)

(58) Field of Classification Search
CPC ......... H04W 74/0808; H04W 72/1278; H04W 52/0206; H04W 72/0406; H04W 72/0426; H04W 74/08
See application file for complete search history.

(56) References Cited

U.S. PATENT DOCUMENTS

| 2017/0264413 A1* | 9/2017 | Azizi | H04L 5/0048 |
| 2017/0289963 A1* | 10/2017 | Choi | H04W 72/04 |

OTHER PUBLICATIONS

"IEEE Std 802.11ac™-2013", IEEE Computer Society-Part 11: Wireless LAN Medium Access Control (MAC) and Physical Layer (PHY) Specifications Amendment 4: Enhancements for Very High Throughput for Operation in Bands below 6 GHz, (Dec. 2013), 425 pgs.

"Part 11: Wireless LAN Medium Access Control (MAC) and Physical Layer (PHY) Specifications", IEEE 802.11-2012. IEEE Standard for Information technology. Telecommunications and information exchange between systems. Local and metropolitan area networks. IEEE Computer Society., (Mar. 29, 2012), 2793 pgs.

Candes, Emmanuel J., "An Introduction to Compressive Sampling", IEEE Signal Processing Magazine 21-30, (Mar. 2008), 10 pgs.

Tropp, Joel A., et al., "Signal Recovery from Random Measurements via Orthogonal Matching Pursuit", In Proceedings of IEEE Transactions on Information Theory, vol. 53, Issue 12, 4655-4666, (Dec. 2007), 12 pgs.

Vegt, Rolf De, "802.11ax Spec Development Process Proposal", IEEE 802.11-14/0419r0 (Qaulcomm), (Mar. 14, 2014), Slide 1-10.

Veli-Pekka, Ketonen, "IEEE802.11ax-High Efficiency WLAN (HEW) Standardization and Potential Technologies", The Wi-Fi Performance Company, (Jun. 3, 2014), 4 pgs.

* cited by examiner

US 10,057,846 B2

ASSOCIATING STATION WITH MASTER STATION

TECHNICAL FIELD

Examples generally relate to systems and methods for associating a station (STA) with a master STA (e.g., an access point (AP)). Some examples regard systems and methods for improving efficiency of such an association. One or more examples relate to the Institute of Electrical and Electronics Engineers (IEEE) 802.11 family of standards including the IEEE 802.11ax High Efficiency Wi-Fi (HEW) proposed standard, among other standards.

BACKGROUND

The IEEE 802.11ax standard targets dense Wi-Fi deployment in which a variety of Wi-Fi devices can connect to one of a variety of master STAs. Each of these devices, sometimes referred to as stations (STAs), can potentially receive transmissions from multiple master STAs during an association phase between the STA and the master STA. The current Wi-Fi specification allows transmission modes for 20 MHz, 40 MHz, 80 MHz, and 160 MHz of bandwidth. Using the current standard protocol, the STA will make a decision to associate with a specific AP based on a highest Received Signal Strength Indicator (RSSI) of only a primary channel, which is 20 MHz.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
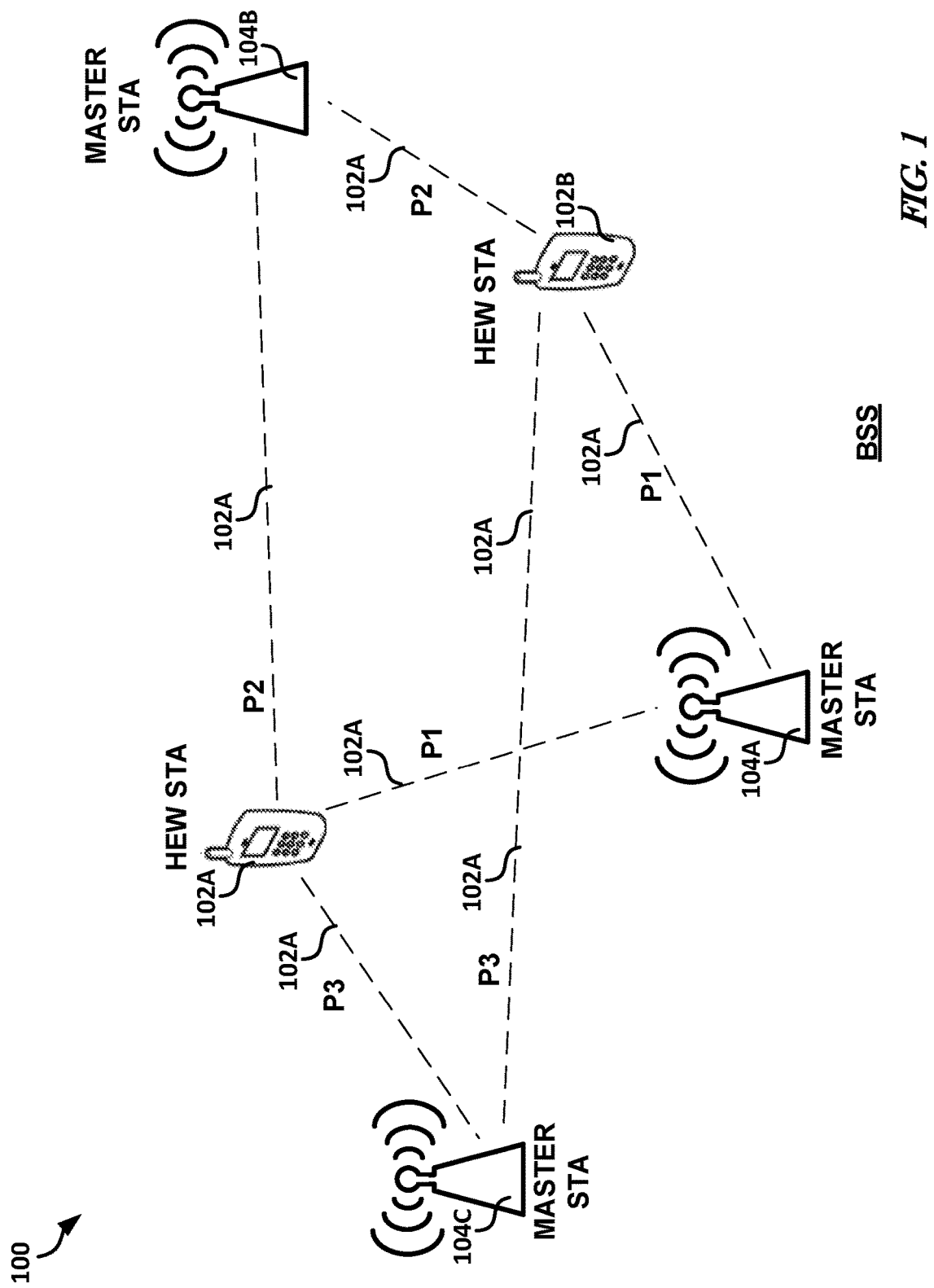
FIG. 1 illustrates, by way of example, a block diagram of a WLAN including multiple basic service sets (BSS) in accord with one or more embodiments.

Examples in this disclosure relate generally to providing an association mechanism that can help an STA improve its decision to associate with a specific AP. Embodiments discussed herein may be applicable to high bandwidth transmission modes (i.e. more than 20 MHz). This disclosure proposes association mechanisms based on an entire transmission bandwidth as compared to association based on only channel condition data on the primary channel. The association decision can take into account the channel information of one or more secondary channels. This can help the association decision since the primary channel may not be a good indicator of the throughput of the entire channel. Additionally, information about the number of active devices, traffic on the master STA, or congestion on a particular STA can be helpful in making a better association decision.

Existing signaling of measurements, such as information on traffic, service, and Basic Service Set (BSS) loads during association, can help the association so devices can be aware of the number of devices, or congestion, on a particular AP. This information is to help the STAs select a "best" AP for association.

One use case of this subject matter includes a device deployed in a dense STA environment and acting in conformance with the 802.11ax standard. The dense STA environments can include devices operating in different transmission bandwidths. The current Wi-Fi specification allows transmission modes for 20 MHz, 40 MHz, 80 MHz, and 160 MHz of bandwidth. Currently, the STA makes a decision to associate with a specific master STA based on the highest RSSI of only the 20 MHz primary channel. As previously discussed, this association may not be a good indicator of the throughput of the entire channel bandwidth. Along with utilizing one or more channel conditions, one or more embodiments can use signaling from each master STA to make STAs aware of the congestion (i.e. current traffic load) on the master STA.

Discussed herein are association mechanisms that allow the STA to make use of the channel information from nearby master STAs regarding a larger portion of the transmission bandwidth than is currently used. One or more embodiments use signaling of the channel traffic information at the master STA in determining which master STA to associate and/or which sub-channel of the master STA to communicate through. Embodiments discussed herein can enhance the association mechanism between the STA and the master STA so the STA can select a "best" master STA better than would be otherwise possible, such as by using the current protocol in the 802.11ax standard. The "best" master STA as used herein is the master STA that will provide the STA with a best throughput based on the data provided by all the master STAs.

In the use case that includes STAs conforming to the 802.11ax standard, Orthogonal Frequency Domain Multiple Access (OFDMA) transmission may be used. A problem with a classical association mechanism effect is more pronounced by the OFDMA structure of 802.11ax since some Resource Blocks (RBs) assigned to a specific STA may have better quality but are located in the secondary channels, and there would be no classical way to assess the viability of such RB. An association mechanism that allows STAs to make use of the channel information from the nearby APs throughout the whole transmission bandwidth, such as along with the number of active devices or congestion, can help enhance the STA associate with the best master STA and not hinder performance using OFDMA.

FIG. 1 illustrates, by way of example, a block diagram of an embodiment of a WLAN including multiple basic service sets (BSSs) 100 in accord with one or more embodiments. The BSSs 100 as illustrated includes a plurality of HEW STAs 102A and 102B each of which is in communication range of a plurality of master STAs 104A, 104B, and 104C. The master STA 104A-C, may be an AP. The plurality of high-efficiency wireless (HEW) (e.g., IEEE 802.11ax) STAs 104. The BSSs 100 can be an extended service set (ESS) and all three master STAs 104A-C can share a same Service Set Identifier (SSID), or all three master STAs 104A-C can each have their own SSID.

The master STA 104A-C may be an AP using signaling conforming to IEEE 802.11 standard to transmit and receive. The master STA 104A-C may be a base station. The master 104A-C may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). In example embodiments, the master STA 104A-C may be configured to communicate with HEW STAs 102A-B in accord with IEEE 802.11ax communication or other techniques.

In one or more embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In one or more embodiments, the bandwidth of a subchannel may be 26-tone (plus a number of up to seven DC nulls), 52-tone, or 106-tone allocations. The exact bandwidth of these allocations are 20 MHz divided by 256 (due to FFT size) and multiplied by the number of tones (e.g., 2.03125 MHz, 2.06 MHz, 4.0625 MHz, or 8.28125 MHz, respectively) plus any bandwidth for direct conversational (DC) nulls. Other bandwidths are possible, such as about 1 MHz, 1.25 MHz, 2.03 MHz, 2.6 MHz, 2.5 MHz, 5 MHz and 10 MHz, or a combination thereof or another bandwidth that is less than or equal to the available bandwidth may also be used.

In one or more embodiments, the bandwidth of the subchannels may be based on a number of active subcarriers. In one or more embodiments the bandwidth of the subchannels are 26, 52, or 106 active subcarriers or tones that can be spaced equally across 20 MHz. In one or more embodiments, the bandwidth of the subchannels is 256 tones spaced equally across 20 MHz. In one or more embodiments, the subchannels are a multiple of 26 tones (plus one or more DC nulls) or a multiple of 20 MHz. In one or more embodiments, a 20 MHz subchannel may comprise 256 tones for a 256 point Fast Fourier Transform (FFT).

A HEW frame may be configured for transmitting a number of spatial streams, which may be formatted in accord with MU-MIMO. In other embodiments, the master STA 104A-C and/or HEW STA 102A-B may implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

One or more embodiments relate to HEW communications or other network configurations, such as future IEEE 802.11 standards. In accord with one or more IEEE 802.11ax embodiments, a master STA 104A-C may operate as a master station which may be arranged to contend for a wireless medium (e.g., during a contention period) to receive exclusive control of the medium, such as for a HEW control period. In one or more embodiments, the HEW control period may be termed a transmission opportunity (TXOP). The master STA 104A-C may transmit a HEW master-sync transmission, which may be a trigger frame or HEW control and schedule transmission, at the beginning of the HEW control period. The master STA 104A-C may transmit a time duration of the TXOP and sub-channel information. During the HEW control period, HEW STAs 102A-B may communicate with the master STA 104A-C in accord with a non-contention based multiple access technique such as OFDMA or MU-MIMO.

This is unlike conventional WLAN communications in which devices communicate in accord with a contention-based communication technique, rather than a multiple access technique. During the HEW control period, the master STA 104A-C may communicate with HEW STAs 102A-B using one or more HEW frames. During the HEW control period, the HEW STAs 102A-B may operate on a sub-channel smaller than the operating range of the master station 104A-C.

In one or more embodiments, the multiple-access technique used during the HEW control period may be a scheduled OFDMA technique, although this is not a requirement. In one or more embodiments, the multiple access technique may be a time-division multiple access (TDMA) technique or a frequency division multiple access (FDMA) technique. In one or more embodiments, the multiple access technique may be a space-division multiple access (SDMA) technique.

In example embodiments, the HEW device 104 and/or the master station 102 are configured to perform the methods and functions herein described with regard to FIGS. 1-5.

The HEW STAs 102A-B are devices that have the capability to implement the 802.11 standard from the Institute of Electrical and Electronics Engineers (IEEE) association. The HEW STA 102A-B can be a phone, such as a Wi-Fi enabled phone, a laptop, tablet, desktop computer, set top box, car computer, or a personal digital assistant (PDA), among other devices capable of implementing the 802.11 standard. An STA is sometimes referred to as a wireless or a node. Formally, an STA as defined in the 802.11 standard is any device that contains an IEEE 802.11-conformant media access control (MAC) and physical layer (PHY) interface to a wireless medium (WM). In one or more embodiments, the HEW STAs 102A-B are High Efficiency devices, such as is discussed with regard to device 600 of FIG. 6.

The master STAs 104A-C are devices that have the capability to implement the master STA functionality defined in the 802.11 standard. The master STA 104A-C allows wireless devices (the HEW STAs 102A-B) to connect to a wired network using the 802.11 standard. The master STAs 104A-C is generally connected to or an integral part of a router.

The 802.11ax standard (and other standards) include an association phase between the master STA 104A-C and the HEW STA 102A-B. During the association phase, the HEW STA 102A-B probes the master STAs 104A-C to receive data from the master STAs 104A-C or listens for a master STA 104A-C beacon in which master STAs 104A-C are available for association. The master STA 104A-C may send one or more signals (e.g., a packet) that includes one or more training fields (e.g., 302 and/or 310), such as in a preamble, or other fields, such as in a payload. The training fields may be used by the HEW STA 102A-B to measure RSSI, estimate a wireless channel state, quality of the wireless channel, and/or an overall channel variance. The payload and/or training fields are referred to herein as channel condition data.

The master STAs 104A-C can provide the HEW STA 102A-B that probes them with data that can be used by the HEW STA 102A-B in determining which master STA 104A-C to associate with. The data provided by the master STAs 104A-C can include a number of STAs currently connected to the master STA 104A-C (e.g., no. STAs 304), one or more signals (e.g., training field 302 and 303 of FIG. 3) that can be used to determine a received signal strength (RSS) value (e.g., received signal strength indicator), a load factor indicating an amount of bandwidth or throughput used and/or available at the master STA 104A-C (e.g., load factor 308 of FIG. 3), a signal that can be used to determine channel quality, channel state, and/or traffic data that indicates how much the load factor, number of STAs, or generally how much the traffic on the master STA 104A-C fluctuates (e.g., traffic 310 of FIG. 3).

Some data regarding channel conditions on secondary and primary channels can be provided to HEW STA 102A-B inside the transmitted frames (e.g., Beacon, a probe response, an association response, or the like). For example, there could be an Information Element to carry "load information" (e.g., load factor, traffic information, number of STAs, or the like. Some data can be measured and calculated at the HEW STA 102A-B, such as RSSI, channel variance, or the like. A transmitted frame can include "training fields" (e.g., STF, LTF, HE-STF, etc.) in the preamble of the frame. These training fields can be used to allow the STA to determine the RSSI, channel variance, or the like.

The data can be used by processing circuitry (e.g., the PHY layer 604) in determining which of the master STAs 104A-C to associate with. In one or more embodiments, each piece of data provided by the master STA 104A-C regards a specific sub-channel of the entire channel through which the master STA 104A-C communicates. The data can regard not only just a 20 MHz primary channel, as in the current 802.11 standard, but can instead regard the entire bandwidth of the master STA transmission including the primary channel and one or more secondary channels. The data can indicate conditions on a plurality of sub-portions of the entire bandwidth that aggregate to the entire bandwidth or can indicate an average value across an entire bandwidth of the master STA 104A-C. The data combined gives the HEW STA 102A-B an indication of the conditions across the entire channel. In one or more embodiments, each of the sub-portions can regard conditions of a sub-portion spanned by a resource block (RB). In such embodiments, the master STA 104A-C can provide load factor, training field(s), traffic information, and/or number of STAs regarding each sub-portion (e.g., sub-channel or RB). Note that some of the data may generally be uniform across all sub-portions (sometimes called sub-channels), such as number of STAs connected and/or load factor may be transmitted without multiplexing (e.g., frequency, code, time, or other multiplexing), in one or more embodiments.

Using such a configuration, an association decision by the HEW STA 102A-B can be based on the entire transmission bandwidth, not just on the primary channel. The association decision can also take into account channel information of the secondary channels as well. Since the primary channel may not be a good indicator of the throughput available on the entire channel. The information can include the signaling of the congestion on the AP (e.g., load factor and/or number of STAs currently connected) so the HEW STA 102A-B can choose a "best" master STA 104A-C to associate with.

The master STA 104A-C can signal the load factor, number of STAs, and/or traffic information, or in a Beacon signaling, which can be received at the HEW STA 102A-B. The HEW STA 102A-B can use one or more of the following metrics to assess channel quality over the entire bandwidth (1) the RSSI of the primary channel and (2) the entire channel frequency response (over the whole operating bandwidth). This can be obtained in a packet of a long training field (LTF) transmission or a sounding packet. In the case of the sounding packet, the HEW STA 102A-B can provide the master STA 104A-C with a training request (TRQ).

Consider a few examples of use cases that can help understand how the data can help the HEW STA 102A-B make an association decision. Consider an example in which channel variations over frequency are not significant (e.g., short channel impulse response). In such examples, the RSSI of the primary channel may be enough for single user association. However, having the load factor or other beacon signaling data can help improve the association, even in single user cases. Referring to FIG. 1, consider an example in which the HEW STA 102A does not face considerable wireless channel variation across the band or does not operate in an OFDMA case (i.e. it will always use an entire bandwidth). The HEW STA 102A can make a decision on the average channel quality (e.g., RSSI) over the entire bandwidth (not per RB as would be the case in an OFDMA situation), the number of STAs already associated to master STAs 104A-C, load information, and/or traffic information, or the like. Consider another example in which the mast STA 104C has ten STAs connected thereto, while master STA 104B has only two HEW STAs connected thereto. Even though channel quality and RSSI measured at the HEW STA 102A can indicate that the master STA 104C is a better choice, the HEW STA 102A may select the master STA 104B because the HEW STA 102A may get more air time with that master STA (since it only has two other STAs to compete with).

In an example that uses OFDMA signaling from the master STA 104A-C, having both the load factor and the RSSI of the entire bandwidth can help the HEW STA 102A-B establish the best link with the master STA 104A-C. In such OFDMA scenarios, even for a nearly flat channel, the load factor on the master STA 104A-C can help the HEW STA 102A-B in making the association decision, such as by helping to reduce the probability of being denied by the master STA 104A-C in the instance of an overloaded master STA 104A-C. Some HEW STAs 102A-B may use only an overall load factor (a load factor indicative of traffic across the whole operating bandwidth), while others may use the load factor for each sub-channel (e.g., OFDMA RB).

When the channel impulse response is longer (e.g., the channel impulse includes a more frequency selective channel), the RSSI of the primary channel is not a good indicator of the throughput available on the entire channel bandwidth. In such channel condition, this metric does not account for bandwidth available on the secondary channels, nor does it account for the loading at a master STA 104A-C, and thus may result in an association decision to associate with a master STA 104A-C that does not have a highest throughput available to the HEW STA 102A-B.

Consider an example in which the primary channel is in a deep fade, while the secondary channel(s) includes a better throughput. If the association decision is made based on RSSI or channel condition data of the primary channel only, the performance of the HEW STA 102A-B can be negatively affected (i.e. STA will not associate to the master STA 104A-C with the best throughput). Consider an example in which the primary channel is very good while one or more of the secondary channels are in a deep fade. The association decision of the HEW STA 102A-B may be affected to the positive side (i.e. STA will associate to the master STA 104A-C with the best primary channel and this may correspond to the master STA 104A-C with the best throughput in this case). These scenarios highlight that using only the RSSI of the primary channel, as is the current practice, may not result in the HEW STA 102A-B associating with the master STA 104A-C that can provide the highest throughput using an OFDMA defined in IEEE 802.11ax. In many instances, the HEW STA 102A-B can make a better association decision with more information.

Providing the load factor, the RSSI of all sub-channels (e.g., RBs in some embodiments) of the entire channel, the number of STAs connected to the master STA 102A-B, and/or the channel variance, can help improve the HEW STA 102A-B make a better association decision in some embodiments. One or more embodiments, can improve the association decision even with a master STA 104A-C that has a highly selective frequency channel.

The 802.11ax standard targets outdoor dense Wi-Fi deployment, such as stadiums, shopping malls, and airports where the channel can have a longer delay. The outdoor channel conditions can help in determining a best master STA to associate with.

After the channel (e.g., sub-channel) information for each master STA 104A-C is available at the HEW STA 102A-B, operations can be performed on the data and/or the data can be analyzed to determine which master STA 104A-C with which to associate. In one or more embodiments, the HEW STA 102A-B can use a first order statistic, such as an average channel energy, and/or a second order statistic, such as the variance, to determine which master STA 104A-C to associate with. The statistic can be obtained for each of the smallest OFDMA bandwidth units (e.g., for the 802.11ax smallest OFDMA bandwidth can be 26, 52, or 106 tones). In general, embodiments discussed herein can be beneficial where a channel has a higher variance or fluctuation on the channel (e.g., sub-channel), sometimes referred as h. For example, consider a situation that includes an 802.11ax OFDMA transmission over 40 MHz channel with a network of three master STAs 104A-C in sufficient proximity to communicate with two HEW STAs 102A-B (such as is shown in FIG. 1).

Consider an embodiment in which each HEW STA 102A-B is equipped with a single antenna, such as shown in FIG. 1. In such a case, the metric h for the i-th OFDMA bandwidth unit for the channel between the k-th master STA 104A-C and the jth HEW STA 102A-B is denoted by h. Assuming that each master STA 104A-C is transmitting a known pattern over the metric h. Moreover, assume, without loss of generality, that the smallest OFDMA bandwidth unit is 5 MHz. Hence, each RB in this example (here, each STA will use 234 data tones, or 20 MHz allocation Bandwidth) will have four values of each piece of information, one for each of the four 5 MHz of bandwidth in the total 20 MHz of the RB. This signal model, $y_j$, at the j-th STA can be defined as:

$y_j = H_j P + \text{noise}$, where $H_j$ is defined as:

$h_{j,1}^1 \quad h_{j,2}^1 \quad h_{j,3}^1$
$h_{j,1}^2 \quad h_{j,2}^2 \quad h_{j,3}^2$
$h_{j,1}^3 \quad h_{j,2}^3 \quad h_{j,3}^3$
$h_{j,1}^4 \quad h_{j,2}^4 \quad h_{j,4}^3$ and P is defined as:

$P_1$
$P_2$
$P_3$

A signal processing technique to find which master STA 104A-C to associate with, is a Compressive Sensing technique, such as can be combined with a sparse recovery algorithm like the Orthogonal Matched Pursuit (OMP) or Ordinary Least Squares (OLS).

A compressive sensing technique acquires and reconstructs a signal, by finding solutions to an underdetermined linear system. Using compressive sensing, the sparsity of a signal can be exploited to recover it from far fewer samples than is normally required, such as by the Shannon-Nyquist theorem. More details regarding compressive sensing are discussed in "An introduction to compressive sampling," by E. Candes and M. B. Wakin, published in IEEE Signal Processing Magazine, vol. 25, pp. 21-30, March 2008, which is incorporated by reference herein in its entirety.

OMP is an iterative greedy algorithm that searches for a single, non-zero entry vector, P, by selecting, at each step, a column of $H_j$ which is most correlated with a current (at iteration t) residual $r_j^t$ (initialized at the first iteration by $r_j^t = y_j$). This column is then added into a set of selected columns (initialized at the first iteration by an empty set). The technique includes updating the residuals by projecting the observation $y_j$ onto a null subspace of a linear subspace spanned by the columns that have already been selected. The technique then iterates. Compared with other alternative methods, a major advantage of the OMP is its simplicity and fast implementation. More information regarding OMP can be found in "Signal recovery from random measurements via orthogonal matching pursuit" by J. Tropp and A. C. Gilbert, published in IEEE Transactions on Information Theory, vol. 53, no. 12, pp. 4655-4666, December 2007, which is incorporated herein by reference in its entirety.

OLS is similar to OMP, with a distinct difference in a selection operation. Greedy techniques to finding a solution generally include the following four operations: (1) initialize (set support set to empty set and solution as zero vector); (2) select variable with best ranking based on some criteria and add the variable to current support set; (3) update solution based on new support set and calculate residual; and (4) stop if solution satisfies stop criteria or repeat from operation (2). While OMP finds a column that is most strongly correlated with the signal residual (as previously discussed), OLS seeks to maximally reduce the residual energy with an enlarged support set. It has been shown that OLS has a better convergence property than OMP but at the expense of being more computationally more expensive.

Using such techniques, the j-th STA can decide to associate to a specific master STA based on the location of the non-zero entry of the vector P. Consequently, the j-th STA can utilize the information regarding the full channel bandwidth for its allocated operating bandwidth in determining which master STA to associate with, such as to get a higher efficiency especially in the highly frequency selective channel models.

Figure 2:
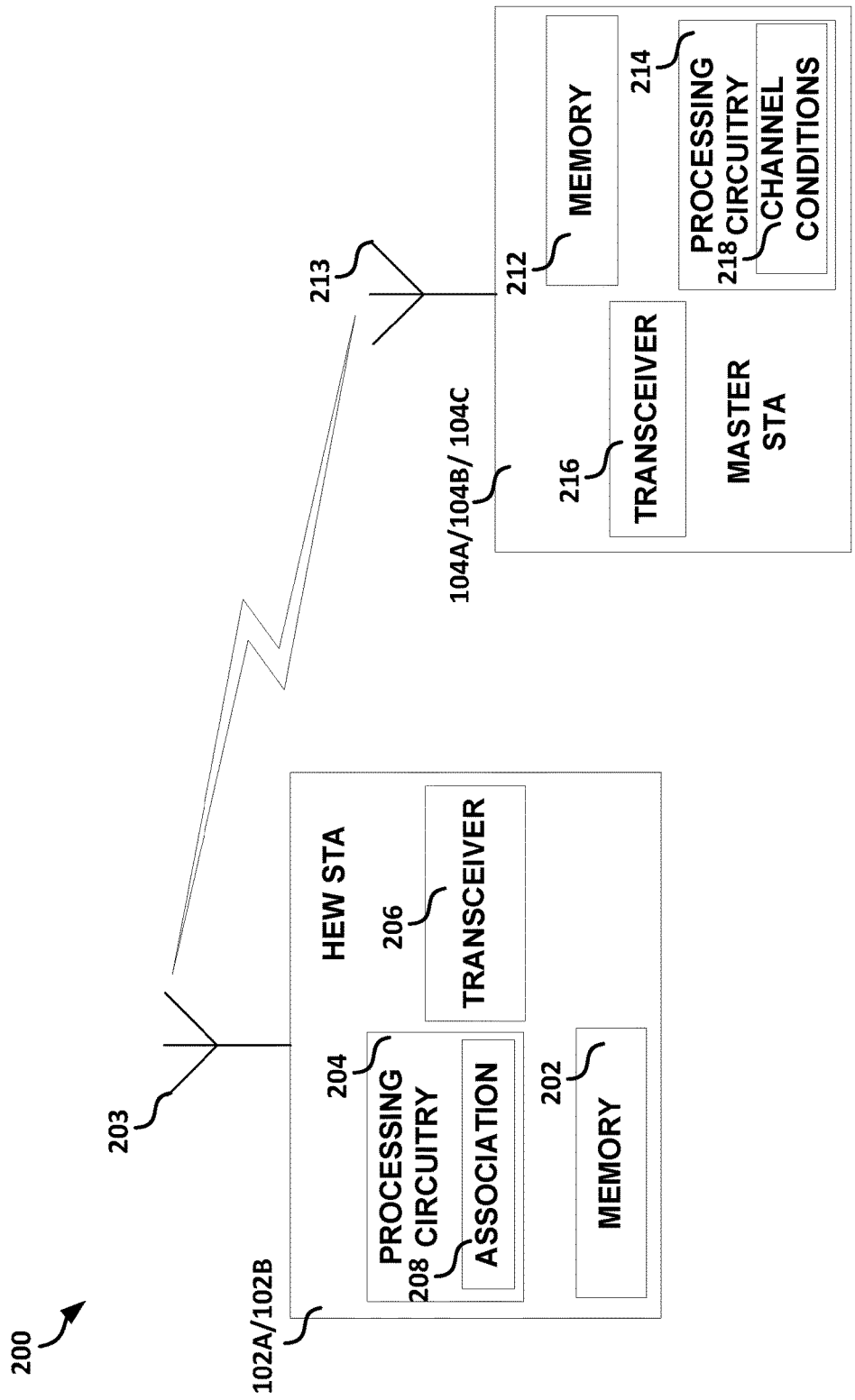
FIG. 2 illustrates, by way of example, a block diagram of a WLAN in accord with one or more embodiments.

FIG. 2 illustrates, by way of example, a block diagram of an embodiment of a WLAN 100, in accord with one or more embodiments. The WLAN 100 as illustrated includes the HEW STA 102A-B and the master STA 104A-C.

The HEW STA 102A-B is illustrated as including a memory 202, processing circuitry 204, a transceiver 206, and an antenna 203. The master STA 104A-C is illustrated as including a memory 212, processing circuitry 214, a transceiver 216, and an antenna 213.

The memory 202 may store information (e.g., data and/or instructions) for configuring the other circuitry to perform operations for configuring and transmitting HEW packets and performing the various operations to perform one or more of the functions and/or methods described herein and/or in conjunction with FIGS. 1-4.

The processing circuitry 204 includes electric and/or electronic components arranged to perform operations (e.g., calculations, issue commands, respond to received signals, encrypt and/or decrypt data, or the like). Electric and/or electronic components can include one or more transistors, resistors, capacitors, inductors, multiplexers, arithmetic logic units, Boolean logic gates (e.g., AND, OR, NAND, NOR, or other logic gates) or other combinational logic, such as inverters, state logic, oscillators, diodes, switches, current and/or voltage regulators, application specific integrated circuits (ASICs), power supplies, current and/or voltage supplies, amplifiers, or the like. The operations can include operations requested by association circuitry 208, performed in response to data received from the association circuitry 208, performed in response to data received at the transceiver circuitry 112A-B, and/or performed in response to executing instructions or accessing data of the memory 202. The processing circuitry 110A-B can perform operations for determining which master STA 104A-C to associate with as well as operations of the 802.11 standard.

The association circuitry 208 can take channel condition data from the master STA 104A-C as input and produce one or more signals indicating which master STA 104A-C to associate with as output. The association circuitry 208 can perform a compressive straining technique, an OMP, an OLS technique, and/or determine one or more averages of channel conditions across the entire channel in determining which master STA 104A-C to associate with. The association circuitry 208 can determine a channel condition metric, such as a first order statistic (e.g., average) or second order statistic (e.g., variance), based on the channel condition data, and use the metric in determining which master STA to associate with.

The transceiver 206 includes electric and/or electronic components to receive electromagnetic transmissions, modulate and demodulate electromagnetic signals to be transmitted and received, respectively, and provide the signals to the antenna 203 for transmission. The transceiver 206 is coupled to one or more antennas 203 that converts electromagnetic radiation into an electrical signal and vice versa.

The antenna(s) 203 converts electromagnetic radiation into electrical signal(s) and vice versa. The antenna(s) may be uni-directional, multi-directional, or omni-directional.

The memory 212 is similar to the memory 202, the transceiver 216 is similar to the transceiver 216, the antenna 213 is similar to the antenna 203 and the processing circuitry 214 is similar to the processing circuitry 204 with the processing circuitry 214 including channel condition circuitry 218 instead of association circuitry 208.

The channel condition circuitry 218 receives data from sensors or other circuitry of the master STA 104A-C, converts the data received to HEW data packet format, and provides the data to other processing circuitry. The data received from the sensor(s) or other circuitry regards channel conditions of primary and secondary channels that span the entire bandwidth of the master STA 104A-C. The channel conditions can include an RSSI, load factor, traffic, channel quality or state, and/or number of STAs connected, among other channel condition data. The channel condition data can be per a specified sub-channel bandwidth of the entire channel bandwidth. The channel condition data can include data for all sub-channels so that the HEW STA 102A-B receives channel condition data regarding the entire channel bandwidth. The channel state and/or channel quality generally refer to data that can be used to determine how much traffic fluctuation is on the corresponding bandwidth (e.g., sub-channel, primary channel, or secondary channel).

Figure 3:
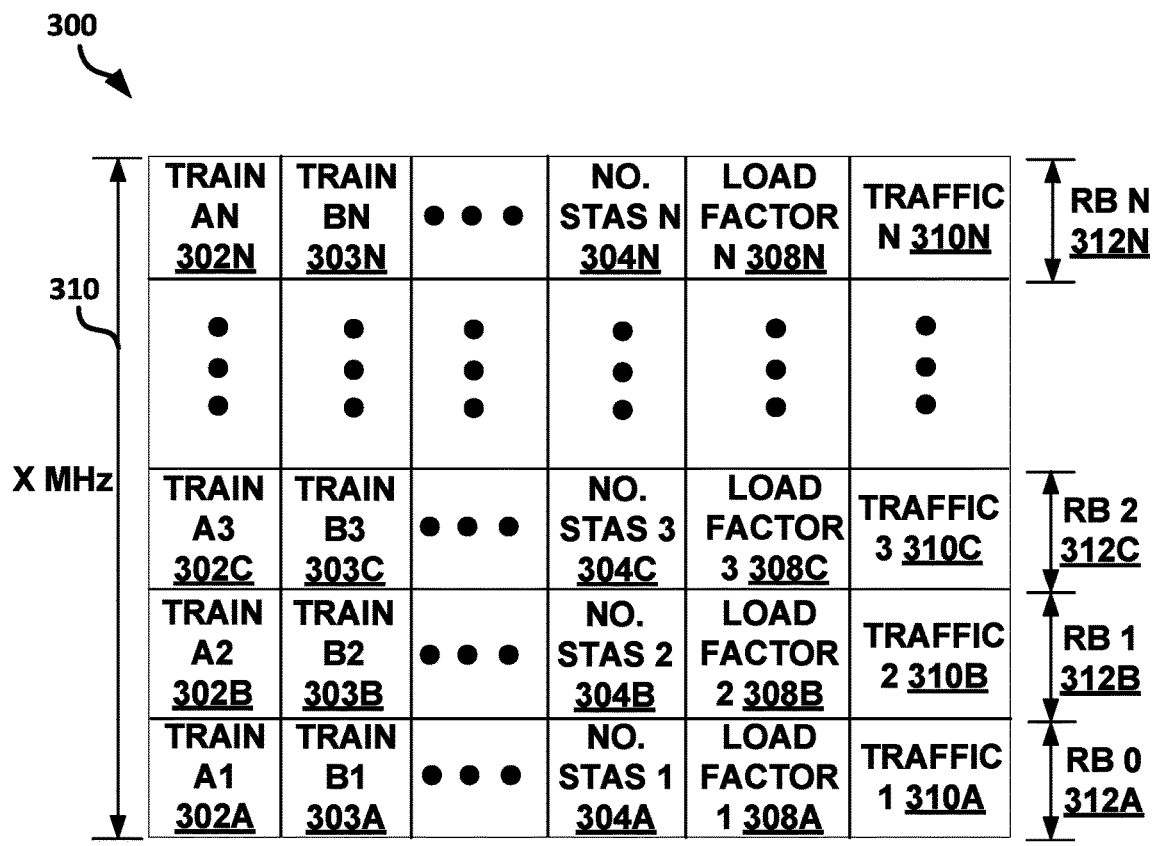
FIG. 3 illustrates, by way of example, a portion of a HEW frame in accord with an embodiment that multiplexes data using OFDMA.

FIG. 3 illustrates, by way of example, a portion of a HEW frame 300 in accord with an embodiment that multiplexes data using OFDMA. The frame 300 is representative of channel condition data regarding the entire bandwidth being provided to the HEW STAs 102A-B. The frame 300 includes an entire bandwidth 310 of X MHz, where X equals 20 MHz, 40 MHz, 80 MHz, 160 MHz, or 320 MHz. The frame 300 is divided into sub-channels, RB 0 312A, RB 1 312B, RB 2 312C, and RB N 312N (312 is used in reference to sub-channels generally herein). Each RB is a sub-channel of the entire bandwidth 310. The sub-channel bandwidth can be 26, 52, or 106 tones, or other bandwidth less than the entire bandwidth and is an integer multiple of the entire bandwidth. Each sub-channel 312 has corresponding channel condition data that can be decoded by the STA 102A-B.

The HEW frame 300 includes channel condition data including one or more training fields 302 and/or 303 (e.g., train A1 302A, train A2 302B, train A3 302C, train AN 302N, train B1 303A, train B2 303B, train B3 303C, and/or train BN 303N), number of STAs connected 304 (e.g., no. STAs 1 304A, no. STAs 2 304B, no. STAs 3 304C, and/or no. STAs N 304N), load factor 308 (e.g., load factor 1 308A, load factor 2 308B, load factor 3 308C, and/or load factor N 308N), and/or traffic data 310 (e.g., traffic 1 310A, traffic 2 310B, traffic 3 310C, and/or traffic N 310N). Note that any one or more of the channel conditions is optional. A HEW STA 102A-C may use one or more of the training fields 302 and/or 303 to measure RSSI, a channel variance, or other channel condition metric.

RSSI is measured using a short training field (STF) and channel quality or channel state is estimated using a long training field (LTF). The STF can include one or more fields, such as a legacy STF (L-STF) and/or high efficiency STF (HE-STF). The LTF can include one or more fields, such as L-LTF and/or HE-LTF.

Figure 4:
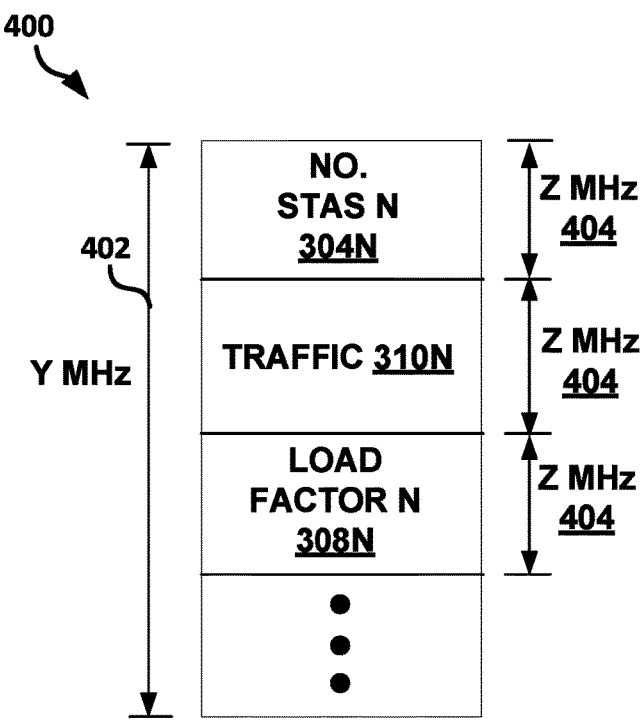
FIG. 4 illustrates, by way of example, a portion of a HEW frame in accord with one or more embodiments that includes frequency multiplexing.

FIG. 4 illustrates, by way of example, a portion of a HEW frame 400 in accord with one or more embodiments that includes frequency multiplexing. The frame 400 is similar to the frame 300 with the frame 400 including multiple channel condition data for a master STA 104A-C and HEW STA 102A-B connection in a single sub-channel spanning Y MHz 402. The frame 400 is further divided into subcarriers of Z bandwidth 404. Note that data regarding multiple sub-channels of the same master STA 104A-C and HEW STA 102A-B connection can be provided in a single RB, such as is shown in FIG. 5.

Figure 5:
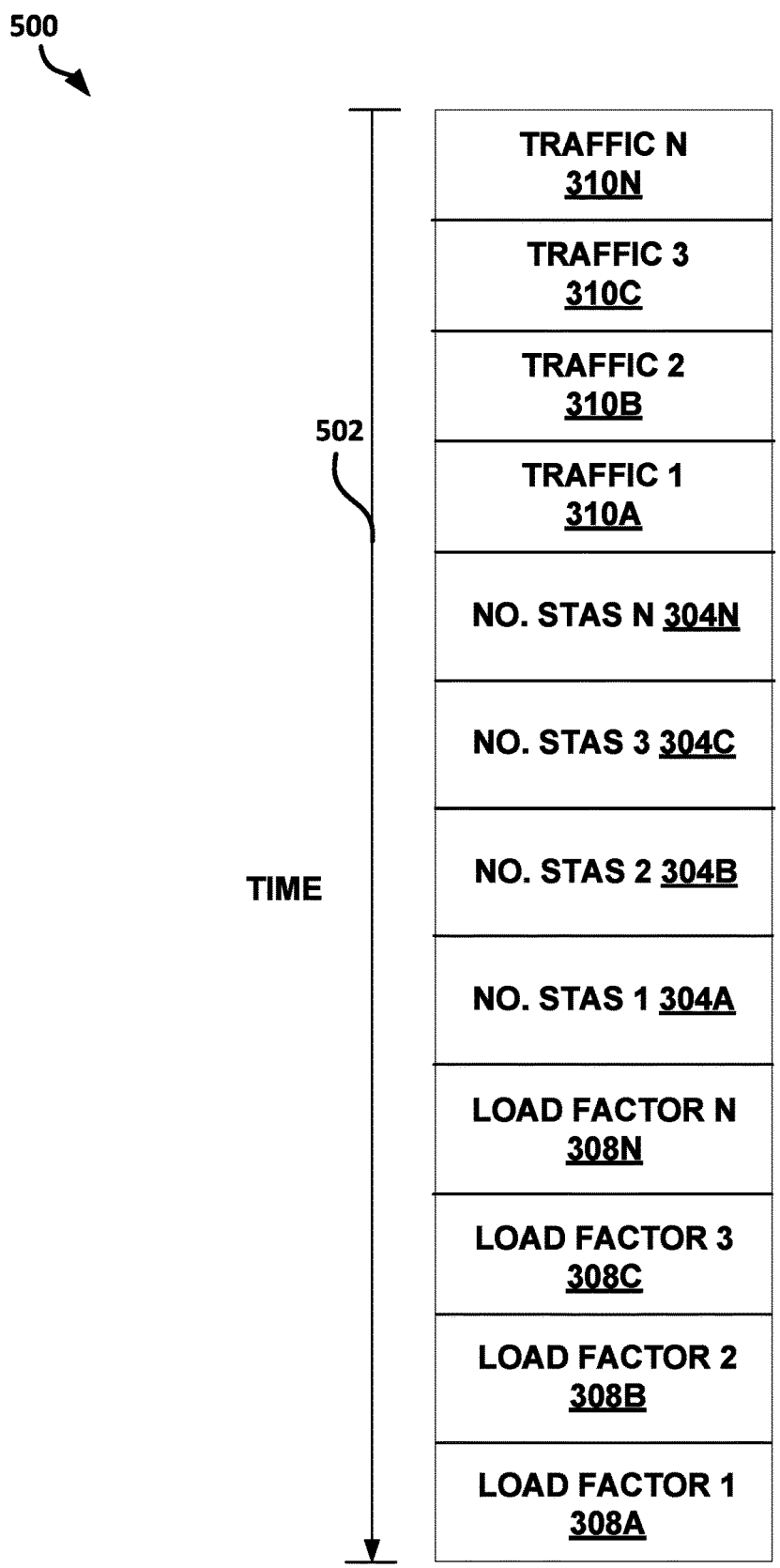
FIG. 5 illustrates, by way of example, a portion of a HEW frame in accord with one or more embodiments that includes time multiplexing.

FIG. 5 illustrates, by way of example, a portion of a HEW frame 500 in accord with one or more embodiments that includes channel condition data. In the frame 500 time 502 elapses along the vertical axis in the direction indicated by the arrow. The frame 500 includes packet that includes channel condition data regarding four sub-channels of a larger bandwidth. The channel condition data 310, 304, and 308 provided can be with regard to different sub-channels of the entire bandwidth of the master STA 104A-C. Consider an example in which the entire bandwidth of the master STA 104A-C is 40 MHz. Each of the traffic data 310A, 310B, 310C, and 310N can be used to indicate traffic conditions on sub-channel, such as a 10 MHz sub-channel. The traffic conditions 310 can be used to determine a metric that can be used by the STA 102A-B to determine which master STA 104A-C to associate with. In an embodiment in which there are more than four sub-channels, the channel condition data can be transmitted in a larger portion of the frame. The frame 500 can be a part of a sounding packet or a beacon, for example. The training field(s) 302 and/or 303 can be prepended to the frame 500 or 400 in a preamble, in one or more embodiments.

Note that while the FIGS. 3-5 show the channel condition data in a specific order, the order may be changed. Also note that while FIG. 305 show specific channel condition data being transmitted, not all channel condition data is required and some of the channel condition data may be excluded from a transmission. The channel condition data can include one or more of the training field(s) 302 and/or 303, number of STAs 304, the load factor 308, and/or the traffic information 310. Each can be for a sub-channel of the entire channel and can include all sub-channels such that the sub-channels span the entire channel and the HEW STA 102A-B can make an association decision based on data regarding the entire channel and not just a 20 MHz wide primary channel.

Figure 6:
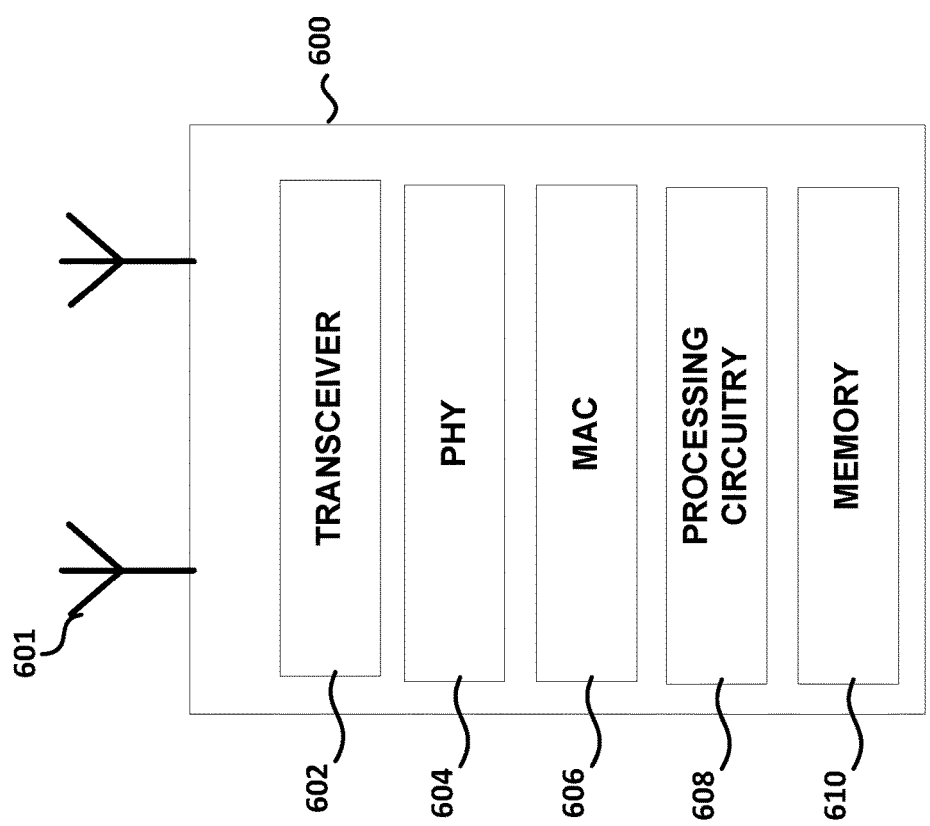
FIG. 6 illustrates a HEW device in accord with one or more embodiments.

FIG. 6 illustrates a HEW device 600 in accord with one or more embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as an access point (AP) 102 (FIG. 1) or a HEW STA 104 (FIG. 1). In accord with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.13 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In one or more embodiments, the MAC circuitry 606 may be arranged to contend for a wireless medium during a contention period to receive control of the medium for the HEW control period and configure an HEW PPDU. In one or more embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In one or more embodiments, the circuitry 608 may include one or more processors. The circuitry 608 may be configured to perform functions based on instructions being stored in a RAM or ROM, or based on special purpose circuitry. The circuitry 608 may include processing circuitry and/or transceiver circuitry in accord with one or more embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In one or more embodiments, the circuitry 608 may be configured to perform one or more of the functions and/or methods described herein and/or in conjunction with FIGS. 1-5.

In one or more embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-5.

In one or more embodiments, the HEW device 600 may be configured to communicate using OFDM communication signals over a multicarrier communication channel. In one or more embodiments, HEW device 600 may be configured to communicate in accord with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accord with other techniques and standards. In one or more embodiments, the HEW device 600 may use 4× symbol duration of 802.11n or 802.11ac.

In one or more embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In one or more embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In one or more multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, one or more elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In one or more embodiments, the functional elements may refer to one or more processes operating on one or more processing elements.

Figure 7:
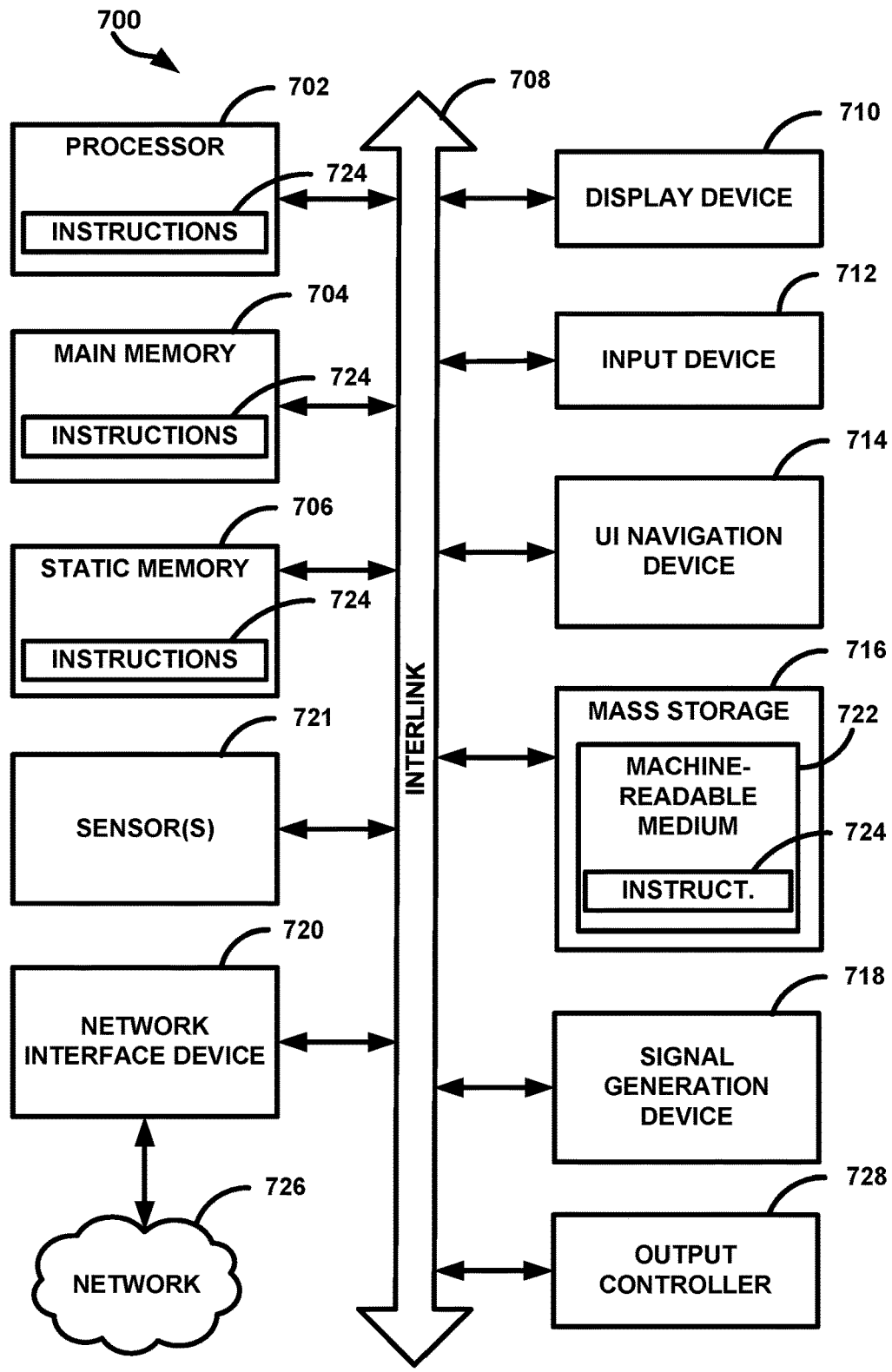
FIG. 7 illustrates, by way of example, a block diagram of an embodiment of a machine on which one or more of the methods as discussed herein can be implemented.

FIG. 7 illustrates, by way of example, a block diagram of an embodiment of a machine 700 on which one or more of the methods as discussed herein can be implemented. The machine 700 can be a part of a HEW STA 102A-B and/or a master STA 104A-C. One or more of the HEW STA 102A-B and/or the master STA 104A-C can include one or more of the items of the machine 300. In one or more embodiments, the HEW STA 102A-C and/or the master STA 104A-C can be implemented by the machine 700. In alternative embodiments, the machine 700 operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The example machine 700 includes a processor 702 (e.g., a central processing unit (CPU), a graphics processing unit (GPU) or both), a main memory 704 and a static memory 706, which communicate with each other via a bus 708. The machine 700 may further include a video display unit 710 (e.g., a liquid crystal display (LCD) or a cathode ray tube (CRT)). The machine 700 may include an alphanumeric input device 712 (e.g., a keyboard), a user interface (UI) navigation device 714 (e.g., a mouse), a disk drive unit 716, a signal generation device 718 (e.g., a speaker) and a network interface device 720.

The memory 704 or 706 are examples of a storage device that can include instructions stored thereon that are executed by a machine, such as a processor or other processing circuitry, and cause the machine to perform operations. The storage device can be programmed and maintained prior to its inclusion in a BIT system. The instructions and other information can be encrypted or otherwise protected by one or more security measures, such as to help protect the operational boundaries and other data stored thereon.

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Examples of items that can be implemented using modules and described herein include the association circuitry 208, channel condition circuitry 218, processing circuitry 204 and 214, PHY 604, MAC 606, transceiver 602, 2026, and 216, or the like. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, etc.) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The modules can be implemented with the division of operations as explained herein or the division of operations can be different such that a single module implements one or more of the operations of two or more of the modules or multiple modules implement the operations of one of the modules.

Additional Notes

The present subject matter may be described by way of several examples.

Example 1 may include or use subject matter (such as an apparatus, a method, a means for performing acts, or a device readable memory including instructions that, when performed by the device, may configure the device to perform acts), such as may include or use an apparatus of a High Efficiency Wireless (HEW) station (STA), the apparatus comprising a memory to store instructions and channel condition data, and processing circuitry coupled to execute the instructions, wherein the instructions, when executed by the processing circuitry, configure the processing circuitry to decode first information provided in a first transmission from a first access point (AP), the first information indicating channel conditions of an entire bandwidth of the first AP including a primary channel and one or more secondary channels of the first AP, decode second information provided a second transmission from a second AP, the second information indicating channel conditions of an entire bandwidth of the second AP including a primary channel and one or more secondary channels of the second AP, and determine which of the first and second APs to associate with based on the first and second decoded information.

Example 2 can include or use, or can optionally be combined with the subject matter of Example 1, to include or use, wherein the first information includes one or more of a first training field used to determine a received signal strength indicator (RSSI), a second training field used to determine channel quality, a load factor, and a number of HEW devices serviced by the first AP for each of a plurality of sub-channels that spans the entire bandwidth of the first AP and the second information includes the same type of information for each of a plurality of channels that spans the entire bandwidth of the second AP.

Example 3 can include or use, or can optionally be combined with the subject matter of at least one of Examples 1-2, to include or use, wherein the entire bandwidth of the first AP or the second AP spans one of 20 MHz, 40 MHz, 80 MHz, and 160 MHz and the first sub-channels each correspond to a subset of the entire bandwidth that spans one of 26, 52, and 106 tones.

Example 4 can include or use, or can optionally be combined with the subject matter of at least one of Examples 1-3, to include or use, wherein determining which of the first and second APs to associate with based on the first and second decoded information includes using compressive sensing and one of an orthogonal matched pursuit and orthogonal least squares process to determine which of the first and second APs to associate with.

Example 5 can include or use, or can optionally be combined with the subject matter of Example 4, to include or use, wherein the processing circuitry is further to determine a sub-channel metric based on the first information for each of the sub-channels and wherein determining which of the first and second APs to associated with includes further using the determined sub-channel metric in the determination.

Example 6 can include or use, or can optionally be combined with the subject matter of at least one of Examples 1-5, to include or use a transceiver and one or more antennas coupled to the processing circuitry, the transceiver, one or more antennas, and the processing circuitry to receive the first transmission from the first AP and the second transmission from the second AP, and provide an association request to one of the first AP and the second AP based on the determination.

Example 7 can include or use, or can optionally be combined with the subject matter of at least one of Examples 1-6, to include or use, wherein the first transmission includes one of a long training field (LTF) and a short training field (STF), and the first transmission includes a sounding packet or a beacon.

Example 8 can include or use, or can optionally be combined with the subject matter of at least one of Examples 2-7, to include or use, wherein the sub-channel metric is a sub-channel variance.

Example 9 can include or use, or can optionally be combined with the subject matter of at least one of Examples 1-8, to include or use, wherein the first information includes a first long training field for each of a plurality of first sub-channels that span the entire first bandwidth and the second information includes a second long training field for each of a plurality of second sub-channels that span the entire second bandwidth, and wherein determining which of the first and second APs to associate with includes determining an average RSSI over all the first sub-channels based on the first long training field and an average RSSI over all the second sub-channels based on the second long training field and associating with the AP that is associated with a larger average RSSI.

Example 10 can include or use, or can optionally be combined with the subject matter of at least one of Examples 1-9, to include or use, wherein the device is an Institute of Electrical and Electronic Engineers (IEEE) 802.11ax STA.

Example 11 can include or use, or can optionally be combined with the subject matter of at least one of Examples 1-10, to include or use, wherein the first and second APs are IEEE 802.11ax APs.

Example 12 may include or use subject matter (such as an apparatus, a method, a means for performing acts, or a device readable memory including instructions that, when performed by the device, may configure the device to perform acts), such as may include or use a non-transitory machine-readable storage device including instructions stored thereon, the instructions, when executed by the machine, configure the machine to decode first information provided in a first transmission from a first access point (AP), the first information indicating channel conditions of an entire bandwidth of the first AP including a primary channel and one or more secondary channels of the first AP, the first information including two or more of a long training field, a short training field, a number of stations connected to the first AP, traffic information on the first AP, and a load factor of the second AP, decode second information provided in a second transmission from a second AP, the second information indicating channel conditions of an entire bandwidth of the second AP including a primary channel and one or more secondary channels of the second AP, the first information including two or more of a long training field, a short training field, a number of stations connected to the second AP, traffic information on the second AP, and a load factor of the second AP, and determine which of the first and second APs to associate with based on the first and second information.

Example 13 can include or use, or can optionally be combined with the subject matter of Example 12, to include or use, wherein the first information includes channel condition data for each of a plurality of sub-channels that span the entire bandwidth of the first AP and the second information includes channel condition data for each of a plurality of sub-channels that span the entire bandwidth of the second AP.

Example 14 can include or use, or can optionally be combined with the subject matter of at least one of Examples 12-13, to include or use, wherein the storage device further includes instructions, when executed by the machine, configure the machine to determine a channel condition metric for each of the sub-channels that span the entire bandwidth of the first and the second APs, wherein the channel condition metric is one of a first order statistic and a second order statistic.

Example 15 can include or use, or can optionally be combined with the subject matter of Example 14, to include or use, wherein determining which of the first and second APs to associate with based on the first and second decoded information includes using compressive sensing and one of an orthogonal matched pursuit and orthogonal least squares process to determine which of the first and second APs to associate with, and wherein the determination includes using the determined channel condition metric to make the determination.

Example 16 can include or use, or can optionally be combined with the subject matter of at least one of Examples 12-15, to include or use, wherein the first information includes a first long training field for each of the plurality of first sub-channels that span the entire first bandwidth and the second information includes a second long training field for each of a plurality of second sub-channels that span the entire second bandwidth, and wherein the instructions for determining which of the first and second APs to associate with include instructions which, when executed by the machine, configure the machine to determine an average RSSI over all the first sub-channels based on the first long training field and an average RSSI over all the second sub-channels based on the second long training field and associate with the AP that is associated with a larger determined average RSSI.

Example 17 can include or use, or can optionally be combined with the subject matter of at least one of Examples 12-16, to include or use, wherein the entire bandwidth of the first AP or the second AP spans one of 20 MHz, 40 MHz, 80 MHz, and 160 MHz and the first sub-channels each correspond to a subset of the entire bandwidth that spans one of 26, 52, and 106 tones.

Example 18 can include or use, or can optionally be combined with the subject matter of at least one of Examples 12-17, to include or use instructions which, when executed by the machine, configure the machine to determine a sub-channel metric based on the first information for each of the sub-channels and wherein the instructions for determining which of the first and second APs to associated with include instructions which, when executed by the machine, configure the machine further use the determined sub-channel metric in the determination.

Example 19 can include or use, or can optionally be combined with the subject matter of at least one of Examples 12-18, to include or use instructions which, when executed by the machine, configure the machine to receive the first transmission from the first AP and the second transmission from the second AP, and provide an association request to one of the first AP and the second AP based on the determination.

Example 20 can include or use, or can optionally be combined with the subject matter of at least one of Examples 12-19, to include or use, wherein the first transmission includes one of a long training field (LTF) and a short training field (STF), and the first transmission includes a sounding packet or a beacon.

Example 21 can include or use, or can optionally be combined with the subject matter of at least one of Examples 17-20, to include or use, wherein the sub-channel metric is a sub-channel variance.

Example 22 may include or use subject matter (such as an apparatus, a method, a means for performing acts, or a device readable memory including instructions that, when performed by the device, may configure the device to perform acts), such as may include or use a method performed by a high efficiency wireless (HEW) station (STA) for associating with an access point (AP) of a plurality of APs, the method comprising decoding first information provided in a first transmission from a first access point (AP) of the plurality of APs, the first information indicating first channel condition data of an entire bandwidth of the first AP including a primary channel and one or more secondary channels of the first AP, the first channel condition data including one or more of a long training field, a short training field, a number of stations connected to the first AP, traffic information on the first AP, and a load factor of traffic on the first AP, decoding second information provided in a second portion of a second transmission from a second AP of the plurality of APs, the second information indicating second channel condition data of an entire bandwidth of the second AP including a primary channel and one or more secondary channels of the second AP, the second channel condition data including one or more of a long training field, a short training field, a number of stations connected to the second AP, traffic information on the second AP, and a load factor of traffic on the second AP, determining which of the first and second APs to associate with based on the first and second information, and providing an association request packet to the first or second AP based on the determination.

Example 23 can include or use, or can optionally be combined with the subject matter of Example 22, to include or use, wherein the first information includes channel condition data for each of a plurality of sub-channels that span the entire bandwidth of the first AP and the second information includes channel condition data for each of a plurality of sub-channels that span the entire bandwidth of the second AP and the method further includes determining a channel condition metric for each of the sub-channels, wherein the channel condition metric is one of a first order statistic and a second order statistic.

Example 24 can include or use, or can optionally be combined with the subject matter of at least one of Examples 21-23, to include or use, wherein determining which of the first and second APs to associate with based on the first and second decoded information includes using compressive sensing and one of an orthogonal matched pursuit and orthogonal least squares process to determine which of the first and second APs to associate with, and wherein the determination includes using the determined channel condition metric for each of the sub-channels to make the determination.

Example 25 can include or use, or can optionally be combined with the subject matter of at least one of Examples 21-24, to include or use, wherein the first information includes a first long training field for each of the plurality of first sub-channels that span the entire first bandwidth and the second information includes a second long training field for each of a plurality of second sub-channels that span the entire second bandwidth, and wherein determining which of the first and second APs to associate with includes determining an average RSSI over all the first sub-channels based on the first long training field and an average RSSI over all the second sub-channels based on the second long training field and associate with the AP that is associated with a larger determined average RSSI.

Example 26 can include or use, or can optionally be combined with the subject matter of at least one of Examples 21-25, to include or use, wherein the first information includes channel condition data for each of a plurality of sub-channels that span the entire bandwidth of the first AP and the second information includes channel condition data for each of a plurality of sub-channels that span the entire bandwidth of the second AP.

Example 27 can include or use, or can optionally be combined with the subject matter of at least one of Examples 21-26, to include or use, wherein the entire bandwidth of the first AP or the second AP spans one of 20 MHz, 40 MHz, 80 MHz, and 160 MHz and the first sub-channels each correspond to a subset of the entire bandwidth that spans one of 26, 52, and 106 tones.

Example 28 can include or use, or can optionally be combined with the subject matter of at least one of Examples 21-27, to include or use receiving the first transmission from the first AP and the second transmission from the second AP, and providing an association request to one of the first AP and the second AP based on the determination.

Example 29 can include or use, or can optionally be combined with the subject matter of at least one of Examples 21-28, to include or use, wherein the first transmission includes one of a long training field (LTF) and a short training field (STF), and the first transmission includes a sounding packet or a beacon.

Example 30 can include or use, or can optionally be combined with the subject matter of at least one of Examples 21-29, to include or use, wherein the sub-channel metric is a sub-channel variance.

Example 31 may include or use subject matter (such as an apparatus, a method, a means for performing acts, or a device readable memory including instructions that, when performed by the device, may configure the device to perform acts), such as may include or use a memory to store instructions and channel condition data, and processing circuitry coupled to execute the instructions, wherein the instructions, when executed by the processing circuitry, configure the processing circuitry to generate a first packet, the first packet including data indicating channel conditions of an entire bandwidth of the AP including a primary channel and one or more secondary channels of the AP, provide the first packet to one or more high efficiency (HE) stations (STAs), and receive an association request from one or more the HE STAs.

Example 32 can include or use, or can optionally be combined with the subject matter of Example 30, to include or use, wherein the data indicating channel conditions of an entire bandwidth of the AP includes one or more of a first training field used to determine a received signal strength indicator (RSSI), a second training field used to determine channel quality, a load factor, and a number of HEW devices serviced by the AP for each of a plurality of sub-channels that spans the entire bandwidth of the AP.

Example 33 can include or use, or can optionally be combined with the subject matter of at least one of Examples 31-32, to include or use, wherein the entire bandwidth of the AP spans one of 20 MHz, 40 MHz, 80 MHz, and 160 MHz and the first sub-channels each correspond to a subset of the entire bandwidth that spans one of 26, 52, and 106 tones.

Example 34 can include or use, or can optionally be combined with the subject matter of at least one of Examples 31-33, to include or use, wherein the first packet includes one of a long training field (LTF) and a short training field (STF), and the first transmission includes a sounding packet or a beacon.

Example 35 can include or use, or can optionally be combined with the subject matter of at least one of Examples 31-34, to include or use, wherein the first information includes a first long training field for each of a plurality of first sub-channels that span the entire first bandwidth that is used by the one or more STAs to determine an RSSI for each of the sub-channels.

Example 36 can include or use, or can optionally be combined with the subject matter of at least one of Examples 31-35, to include or use, wherein the apparatus is an Institute of Electrical and Electronic Engineers (IEEE) 802.11ax AP.

Example 37 may include or use subject matter (such as an apparatus, a method, a means for performing acts, or a device readable memory including instructions that, when performed by the device, may configure the device to perform acts), such as may include or use a non-transitory machine-readable storage device including instructions stored thereon, the instructions, when executed by the machine, configure the machine to generate a first packet, the first packet including data indicating channel conditions of an entire bandwidth of the AP including a primary channel and one or more secondary channels of the AP, provide the first packet to one or more high efficiency (HE) stations (STAs), and receive an association request from one or more the HE STAs.

Example 38 can include or use, or can optionally be combined with the subject matter of Example 37, to include or use, wherein the data indicating channel conditions of an entire bandwidth of the AP includes one or more of a first training field used to determine a received signal strength indicator (RSSI), a second training field used to determine channel quality, a load factor, and a number of HEW devices serviced by the AP for each of a plurality of sub-channels that spans the entire bandwidth of the AP.

Example 39 can include or use, or can optionally be combined with the subject matter of at least one of Examples 37-38, to include or use, wherein the entire bandwidth of the AP spans one of 20 MHz, 40 MHz, 80 MHz, and 160 MHz and the sub-channels each correspond to a subset of the entire bandwidth that spans one of 26, 52, and 106 tones.

Example 40 can include or use, or can optionally be combined with the subject matter of at least one of Examples 37-39, to include or use, wherein the first packet includes one of a long training field (LTF) and a short training field (STF), and the first transmission includes a sounding packet or a beacon.

Example 41 can include or use, or can optionally be combined with the subject matter of at least one of Examples 37-40, to include or use, wherein the first information includes a first long training field for each of a plurality of first sub-channels that span the entire first bandwidth that is used by the one or more STAs to determine an RSSI for each of the sub-channels.

Example 42 may include or use subject matter (such as an apparatus, a method, a means for performing acts, or a device readable memory including instructions that, when performed by the device, may configure the device to perform acts), such as may include or use a method performed by an access point (AP), the method comprising generating a first packet, the first packet including data indicating channel conditions of an entire bandwidth of the AP including a primary channel and one or more secondary channels of the AP, providing the first packet to one or more high efficiency (HE) stations (STAs), and receiving an association request from one or more the HE STAs.

Example 43 can include or use, or can optionally be combined with the subject matter of Example 42, to include or use, wherein the data indicating channel conditions of an entire bandwidth of the AP includes one or more of a first training field used to determine a received signal strength indicator (RSSI), a second training field used to determine channel quality, a load factor, and a number of HEW devices serviced by the AP for each of a plurality of sub-channels that spans the entire bandwidth of the AP.

Example 44 can include or use, or can optionally be combined with the subject matter of at least one of Examples 42-43, to include or use, wherein the entire bandwidth of the AP spans one of 20 MHz, 40 MHz, 80 MHz, and 160 MHz and the sub-channels each correspond to a subset of the entire bandwidth that spans one of 26, 52, and 106 tones.

Example 45 can include or use, or can optionally be combined with the subject matter of at least one of Examples 42-44, to include or use, wherein the first packet includes one of a long training field (LTF) and a short training field (STF), and the first transmission includes a sounding packet or a beacon.

Example 46 can include or use, or can optionally be combined with the subject matter of at least one of Examples 42-45, to include or use, wherein the first information includes a first long training field for each of a plurality of first sub-channels that span the entire first bandwidth that is used by the one or more STAs to determine an RSSI for each of the sub-channels.

The above detailed description includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. An apparatus of a High Efficiency station (HE STA), the apparatus comprising:
   a memory to store instructions and channel condition data;
   a transceiver and one or more antennas to receive a first transmission from a first access point (AP) and a second transmission from a second access point;
   processing circuitry coupled to execute the instructions, wherein the instructions, when executed by the processing circuitry, configure the processing circuitry to:
   decode first information provided in the first transmission, the first information indicating channel conditions of an entire bandwidth of the first AP including a primary channel and one or more secondary channels of the first AP, the first information including, (1) on each sub-channel of a plurality of sub-channels that span the entire bandwidth of the first AP, a load factor of the respective sub-channel and (2) a number of STAs currently connected to the first AP, wherein the load factor indicates an amount of throughput of the first AP that is available;
   decode second information provided in the second transmission, the second information indicating channel conditions of an entire bandwidth of the second AP including a primary channel and one or more secondary channels of the second AP, the second information including, (1) on each sub-channel of a plurality of sub-channels that span the entire bandwidth of the second AP, a load factor of the respective sub-channel and (2) a number of STAs currently connected to the second AP, wherein the load factor indicates an amount of throughput of the second AP that is available;
   determine which of the first and second APs to associate with based on the first and second decoded information; and
   provide an association request packet to the first or second AP based on the determination to establish a communication between the first or second AP and the HE STA.

2. The apparatus of claim 1, wherein the entire bandwidth of the first AP or the second AP spans one of 2.0 MHz, 40 MHz, 80 MHz, and 160 MHz and the first sub-channels each correspond to a subset of the entire bandwidth that spans one of 26, 52, and 106 tones.

3. The apparatus of claim 2, wherein determining which of the first and second APs to associate with based on the first and second decoded information includes using compressive sensing and one of an orthogonal matched pursuit and orthogonal least squares process to determine which of the first and second APs to associate with.

4. The apparatus of claim 3, wherein the processing circuitry is further to determine a sub-channel metric based on the first information for each of the sub-channels and wherein determining which of the first and second APs to associated with includes further using the determined sub-channel metric in the determination.

5. The apparatus of claim 1, wherein the first transmission includes one of a long training field (LTF) and a short training field (STF), and the first transmission includes a sounding packet or a beacon.

6. The apparatus of claim 5, wherein the sub-channel metric is a sub-channel variance for each sub-channel.

7. The apparatus of claim 1, wherein the first information includes a first long training field for each of a plurality of first sub-channels that span the entire first bandwidth and the second information includes a second long training field for each of a plurality of second sub-channels that span the entire second bandwidth, and wherein determining which of the first and second APs to associate with includes determining an average RSSI over all the first sub-channels based on the first long training field and an average RSSI over all the second sub-channels based on the second long training field and associating with the AP of the first and second APs that is associated with a larger average RSSI.

8. The apparatus of claim 1, wherein the HE STA is configured to operate in accordance with an Institute of Electrical and Electronic Engineers (IEEE) 802.11ax standard.

9. The apparatus of claim 8, wherein the first and second APs are HE APs configured to operate in accordance with an IEEE 802.11ax standard.

10. A non-transitory machine-readable storage device including instructions stored thereon, the instructions, when executed by the machine, configure the machine to:
receive a first transmission from a first access point (AP);
decode first information provided in the first transmission, the first information indicating channel conditions of an entire bandwidth of the first AP including a primary channel and one or more secondary channels of the first AP, the first information including a number of stations connected to the first AP, and on each sub-channel of a plurality of sub-channels that span the entire bandwidth of the first AP, a load factor for each of the respective sub-channel, wherein the load factor indicates an amount of throughput of the first AP that is available;
receive a second transmission from a second access point (AP);
decode second information provided in the second transmission, the second information indicating channel conditions of an entire bandwidth of the second AP including a primary channel and one or more secondary channels of the second AP, the second information including a number of stations connected to the second AP, and on each sub-channel of a plurality of sub-channels that span the entire bandwidth of the first AP, a load factor for each of the respective sub-channel, wherein the load factor indicates an amount of throughput of the second AP that is available;
determine which of the first and second APs to associate with based on the first and second information; and
provide an association request packet to the first or second AP based on the determination to establish a communication between the first or second AP and the machine.

11. The storage device of claim 10, wherein the storage device further includes instructions, when executed by the machine, configure the machine to:
determine a channel condition metric for each of the sub-channels that span the entire bandwidth of the first and the second APs, wherein the channel condition metric is one of a first order statistic and a second order statistic.

12. The storage device of claim 11, wherein determining which of the first and second APs to associate with based on the first and second decoded information includes using compressive sensing and one of an orthogonal matched pursuit and orthogonal least squares process to determine which of the first and second APs to associate with, and wherein the determination includes using the determined channel condition metric to make the determination.

13. The storage device of claim 12, wherein the first information includes a first long training field for each of the plurality of first sub-channels that span the entire first bandwidth and the second information includes a second long training field for each of a plurality of second sub-channels that span the entire second bandwidth, and wherein the instructions for determining which of the first and second APs to associate with include instructions which, when executed by the machine, configure the machine to determine an average RSSI over all the first sub-channels based on the first long training field and an average RSSI over all the second sub-channels based on the second long training field and associate with the AP that is associated with a larger determined average RSSI.

14. A method performed by a high efficiency station (HE STA) for associating with an access point (AP) of a plurality of APs, the method comprising:
receiving a first transmission from a first AP of the plurality of APs;
decoding first information provided in the first transmission, the first information indicating first channel condition data of an entire bandwidth of the first AP including a primary channel and one or more secondary channels of the first AP, the first channel condition data including a number of stations connected to the first AP and on each sub-channel of a plurality of sub-channels that span the entire bandwidth of the first AP, a load factor of traffic on the first AP for each of the respective sub-channels, wherein the load factor indicates an amount of throughput of the first AP that is available;
receiving a second transmission from a second AP of the plurality of APs;
decoding second information provided the second transmission, the second information indicating second channel condition data of an entire bandwidth of the second AP including a primary channel and one or more secondary channels of the second AP, the second channel condition data including a number of stations connected to the second AP and on each sub-channel of a plurality of sub-channels that span the entire bandwidth of the second AP, a load factor of traffic on the second AP for each of the respective sub-channels, wherein the load factor indicates an amount of throughput of the second AP that is available;
determining which of the first and second APs to associate with based on the first and second information; and
providing an association request packet to the first or second AP based on the determination to establish a connection between the first or second AP and the HE STA.

15. The method of claim 14, wherein the method further includes:
determining a channel condition metric for each of the sub-channels, wherein the channel condition metric is one of a first order statistic and a second order statistic.

16. The method of claim 15, wherein determining which of the first and second APs to associate with based on first and second decoded information includes using compressive sensing and one of an orthogonal matched pursuit and orthogonal least squares process to determine which of the first and second APs to associate with, and wherein the determination includes using the determined channel condition metric for each of the sub-channels to make the determination.

17. The method of claim 16, wherein the first information includes a first long training field for each of the plurality of first sub-channels that span the entire first bandwidth and the second information includes a second long training field for each of a plurality of second sub-channels that span the entire second bandwidth, and wherein determining which of the first and second APs to associate with includes determining an average RSSI over all the first sub-channels based on the first long training field and an average RSSI over all the second sub-channels based on the second long training field and associate with the AP that is associated with a larger determined average RSSI.

* * * * *

UNITED STATES PATENT AND TRADEMARK OFFICE
CERTIFICATE OF CORRECTION

PATENT NO. : 10,057,846 B2
APPLICATION NO. : 14/973224
DATED : August 21, 2018
INVENTOR(S) : Mohamed et al.

Page 1 of 1

It is certified that error appears in the above-identified patent and that said Letters Patent is hereby corrected as shown below:

In the Claims

Column 24, Line 52, Claim 2, delete "2.0" and insert --20-- therefor

Signed and Sealed this
Nineteenth Day of January, 2021

Andrei Iancu
*Director of the United States Patent and Trademark Office*